Apr. 24, 1923.
A. VARAUD
1,453,087
TIME INDICATOR
Filed Nov. 5, 1921
4 Sheets-Sheet 1
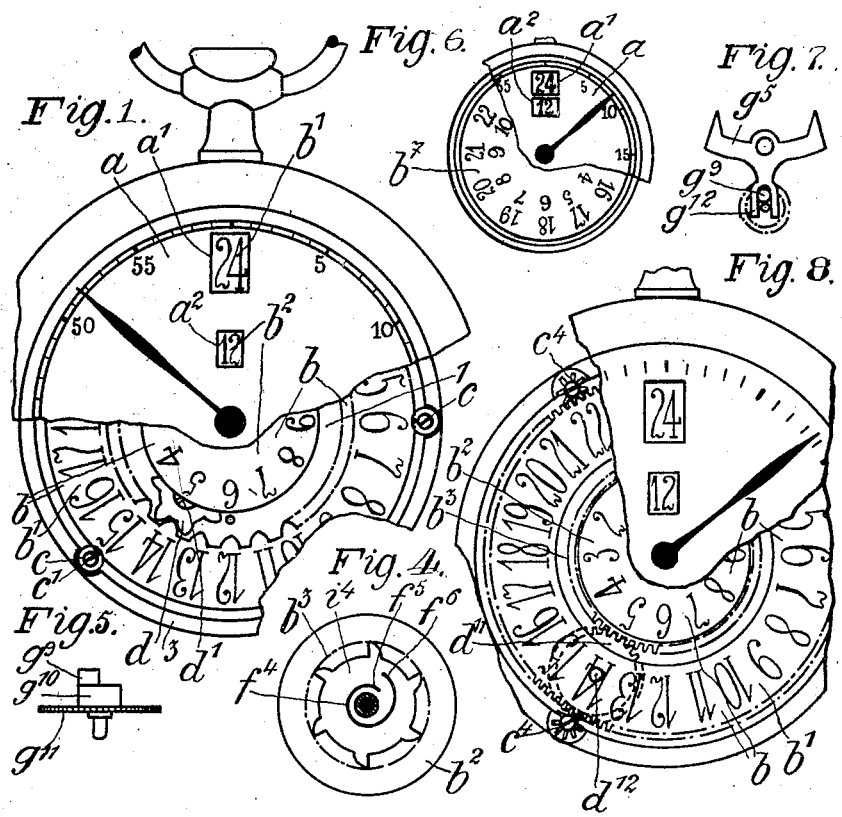

Apr. 24, 1923. 1,453,087
A. VARAUD
TIME INDICATOR
Filed Nov. 5, 1921 4 Sheets-Sheet 2
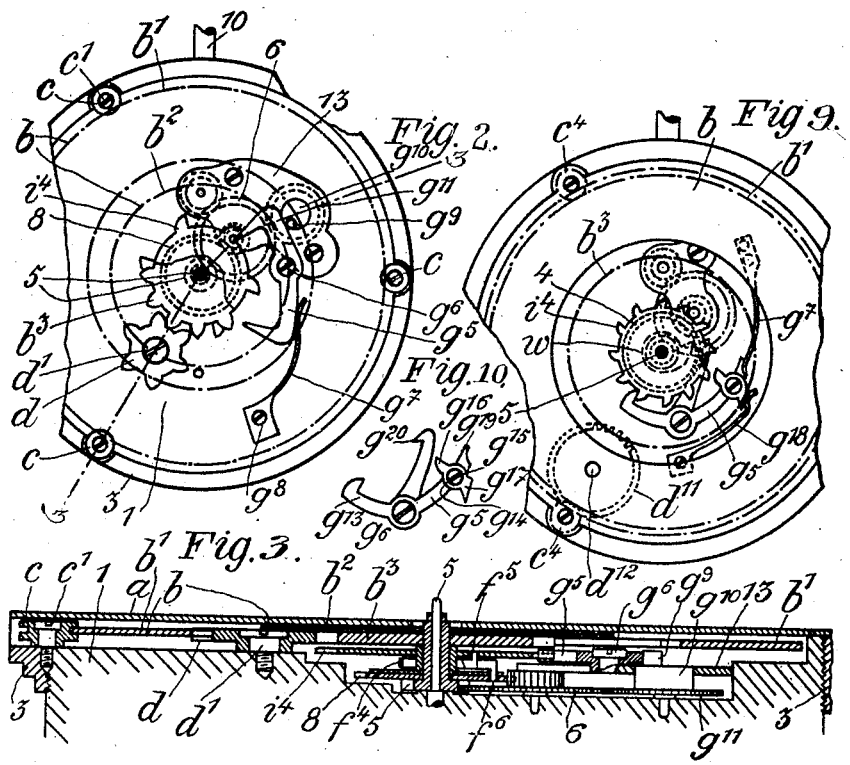

Apr. 24, 1923.
A. VARAUD
1,453,087
TIME INDICATOR
Filed Nov. 5, 1921
4 Sheets-Sheet 3
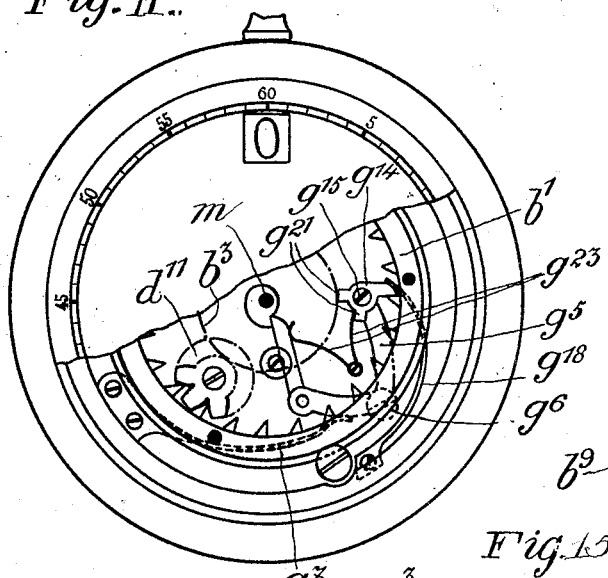
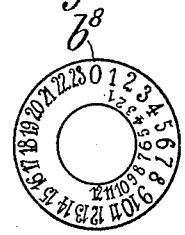
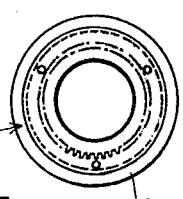
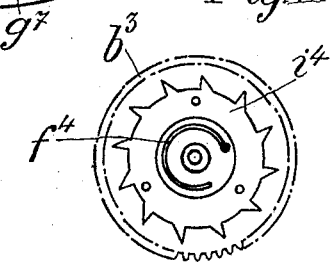
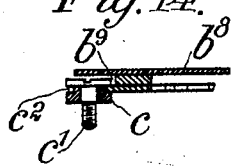
Inventor
André Varaud
By Serrell &on
his Attorneys.

Apr. 24, 1923.

A. VARAUD 1,453,087

TIME INDICATOR

Filed Nov. 5, 1921

Inventor
André Varaud
By [signature]
his Attorneys

Patented Apr. 24, 1923.

1,453,087

UNITED STATES PATENT OFFICE.

ANDRÉ VARAUD, OF VESENAZ, NEAR GENEVA, SWITZERLAND, ASSIGNOR TO THE SOCIÉTÉ ANONYME D'HORLOGERIE ET BIJOUTERIE DE GENÈVE, OF GENEVA, CANTON OF GENEVA, SWITZERLAND, A COMPANY OF SWITZERLAND.

TIME INDICATOR.

Original application filed August 11, 1920, Serial No. 402,920. Divided and this application filed November 5, 1921. Serial No. 513,121½.

*To all whom it may concern:*

Be it known that I, ANDRÉ VARAUD, watchmaker, a citizen of France, residing at Vesenaz, near Geneva, Canton of Geneva, in the Confederation of Switzerland, have invented certain new and useful Improvements in Time Indicators (for which I have filed application in Switzerland, March 29, 1919, April 29, 1919, and Oct. 29, 1919), of which the following is a specification.

This invention has for its object a time indicator of the type in which a movable dial bearing chronometric indications arranged circularly moves always in the same direction under a fixed dial having at least one opening in it, and this application is a division of my copending application, Serial No. 402,920, filed August 11, 1920 for Letters Patent for an improvement in time indicators.

The invention is represented in the accompanying drawings which show as examples thereof, several constructional forms, all adapted to already known sizes of watches, clocks or alarms.

Figs. 1 to 19 relate to constructional forms in which an anchor escapement is used.

Figures 1 to 7 relate to a first constructional form and of these

Figure 1 is a front elevation with part of the case and the fixed dial broken away.

Figure 2 is the same elevation with more of the dial removed.

Figure 3 is a transverse section on the line 3—3 of Figure 2.

Figure 4 is a detail view showing from underneath the disc of the movable dial and the escape wheel.

Figure 5 is a detail view showing detached the cam which operates the anchor escapement.

Figure 6 is an elevation with part of the case and of the fixed dial removed of a modification and Figure 7 is a detail view showing detached a modification of the form of the anchor escapement.

Figures 8 to 11 relates to a second constructional form and of these

Figure 8 is an elevation with part of the case and of the fixed dial broken away.

Figure 9 is the same elevation with the disc of the movable dial more removed.

Figure 10 is a detail view showing part of the anchor escapement of this form, and Figure 11 is an elevation with part of the case and of the fixed dial broken away of a third constructional form.

Figures 12 to 19 are detail views of these three forms.

Figure 12 representing the movable dial of the third form.

Figure 13 this movable dial seen from underneath and

Figure 14 the connection of the edge of this movable dial and a roller.

Figure 15 is the escape wheel seen from underneath.

Figure 16:
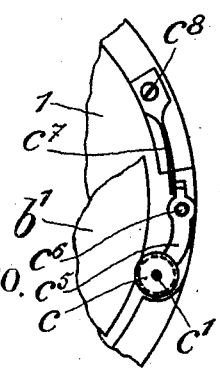

Figure 16 is the movable roller.

Figure 17:
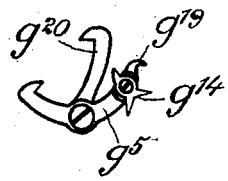
Figure 18:
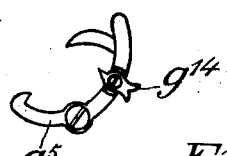
Figure 19:
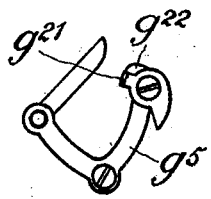

Figures 17 to 19 four forms of the anchor.

Figure 20:
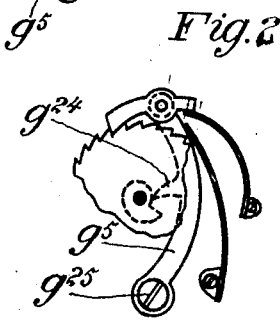

Fig. 20 is another form of anchor.

In the first of the forms (see Figs. 1 to 7) the escapement of one tooth of the wheel $i^4$ takes place every hour that elapses by means of an anchor $g^5$. The distance of the two arms of this anchor from each other corresponds to the interval or one tooth and a half of the wheel $i^4$.

The active surface of the teeth of the escape wheel $i^4$ as well as that of the arms of the anchor $g^5$ is radial with respect to the centre of the said wheel $i^4$, that is to say, it has no inclined planes so as to prevent the wheel $i^4$ from escaping accidentally.

The oscillating movement of the anchor $g^5$ is imparted to it in one direction by a spring $g^7$ fixed to the plate 1 at $g^8$ and in the other direction by a step $g^9$ fixed eccentrically on a cylindrical shaft $g^{10}$ integral with a wheel $g^{11}$ and pivoted on the one hand in the plate 1 and on the other hand in a bridge 13 screwed to this latter. This wheel $g^{11}$ gears with a minute wheelwork 6 by means of a series of teeth, the number of which double that of the cannon pinion 5, upon the barrel of which is fixed the minute hand so that it makes half a revolution on itself per hour.

The length of the arms of the anchor is calculated in such a way that the contrary actions of the spring $g^7$ and of the eccentric $g^9$ are exerted alternately on the anchor which cogs by means of one of its arms a tooth of the wheel during half a revolution of this eccentric, that is during one hour. The end of the active arm of the anchor engaging right home and sliding over the cogged teeth and disengaging itself therefrom during this lapse of time. At the dead point of the oscillation of the anchor the escape of this tooth is produced and the wheel $i^4$ moves in the direction of the hands of a watch until that one of these teeth which follows the liberated tooth meets the other arm of the anchor. This tooth is then cogged by this arm moving over it under the action of the spring $g^7$ in one direction for 30 minutes and in the reverse direction for another 30 minutes during the next hour, and so on.

In this form of the invention the escapement wheel $i^4$ has associated therewith a disk 8, the parts of which are connected by a spring $f^4$, the end $f^5$ of the spring being connected to one of the said members and the opposite end $f^6$ of the spring being connected to the other of said members. The disk 8 is turned with the cannon pinion so that the spring has tension applied thereto until the escapement wheel is released when the spring causes the escapement wheel to turn thereby turning the gear wheel $b^3$ which actuates the pinion $d$ to turn the revoluble disk $b'$ a predetermined portion of a revolution.

In watches, alarms or clocks in which the seconds hand is dispensed with, the ring $b^1$ and the disc $b^2$ which form the movable dial may be replaced by a single disc $b^7$ having two concentric rows of hour indications numbered respectively from 13 to 24 and from 1 to 12 (see Fig. 6).

In the modification of the anchor shown in Fig. 7 the tension spring $g^7$ is dispensed with and the anchor $g^5$ has a fork $g^{12}$ in which is continually engaged the eccentric $g^9$.

In another constructional form of anchor shown in Figs. 8 to 10 the ring $b^1$ of the movable dial $b$ has an external series of teeth which gear with three small pinions $c^4$ which replace the rollers $c$ as shown in Fig. 1. One of these pinions is driven by a wheel $d^{11}$ mounted freely on a screw $d^{12}$ under the ring $b^1$. This wheel $d^{11}$ is driven periodically by the wheel $b^3$ integral with the disc $b^2$.

The ratios of these gears are so arranged that the ring $b^1$ makes one revolution in 24 hours while the disc $b^2$ makes one revolution in 12 hours.

The escapement wheel $i^4$ is of smaller diameter than the one in the preceding form and has 12 teeth instead of six.

The anchor $g^5$ constituting the escapement device has a re-entrant fixed arm $g^{13}$ and a movable projecting arm $g^{14}$, constituted by a small lever pivoted at $g^{15}$ in an opening in the anchor. The part $g^{16}$ of this lever constitutes the projecting movable arm of the anchor. The opposite part $g^{17}$ is subjected to the action of a spring $g^{18}$ which tends to move the lever in the direction of the hands of a watch. The end of the part $g^{19}$ of the anchor is subjected to the action of a spring $g^7$ as in the preceding form.

The oscillation of this anchor is controlled by means of a pawl $g^{20}$ which is integral therewith by means of a snail $w$ fixed on the cannon pinion 5.

In the position shown in Fig. 9 the projecting movable arm $g^{14}$ is just quitting the tooth of the wheel $i^4$ which it had locked during the whole of the rise of the pawl up the snail without there having been any movement of the escapement wheel because at this moment the re-entrant and fixed arm $g^{13}$ had already engaged the third following tooth.

This arm $g^{14}$ under the action of the spring $g^{18}$ is then slightly moved towards the right so as to permit its active face to come radial again with respect to the escapement wheel when the pawl $g^{20}$ falling on the start of the snail will cause the anchor to oscillate. This is in order to allow this arm to engage easily with the tooth which follows that which it has just quitted immediately after the escape of one tooth of the wheel $i^4$ has been produced.

The radial face of the snail $w$ and the shaft of the minute hand mounted likewise on the cannon pinion are disconnected from each other so that the escape of one tooth of the wheel $i^4$ may take place when this hand passes opposite the indication 60 on the fixed dial.

The escapement wheel $i^4$ might also have 24 teeth. In this case the cannon wheel 8 would have to be driven with a reduction of speed from 24 to 12 with respect to one revolution of the cannon pinion.

With such an escape wheel if the watch has no seconds pinion, there may be adapted to it a disc $b^8$ forming of itself the movable dial and carrying a row arranged circularly of indications numbered from 23 to 0 and a concentric row of indications numbered from 1 to 12 and arranged in a semicircle (see Fig. 12).

In the constructional form of the anchor shown in Fig. 11 the anchor $g^5$ which oscillates about a carrier screw $g^6$, is seated in a hollow made in the plate of the watch and is placed under the action of a tension spring $g^7$ which is very light.

The movable lever $g^{14}$ oscillates about the carrier screw $g^{15}$ which is screwed into the end of the projecting arm of the anchor and is provided with stops $g^{21}$ bent at a right angle downwards so as to limit the stroke in two directions by means of a V spring $g^{23}$. The movable lever is also as formerly subjected to the action of a tension spring $g^{18}$.

The oscillation of the anchor is produced in the same ways as in the preceding form but in place of the anchor allowing one of the teeth of the escapement wheel $i^4$ to escape in this form it is the teeth of the ring $b^1$ which allow it to escape one by one every hour.

Fig. 19 shows a modified form of anchor employed in this form, in which there is only one stop $g^{21}$ co-operating with a stop $g^{22}$ carried on the end of the arm of the anchor.

The angle of opening left free between this stop and the projecting arm of the anchor is about 30°.

Fig. 13 shows detached and seen from underneath the movable dial of this construction form. The toothed ring $b^1$ which has its teeth inside in this form does not carry the hour indications directly.

These are placed on a circle $b^8$ which is easily removable. Furthermore in this form of construction the ring $b^1$ has a circular groove $b^9$ to prevent the circle $b^8$ from rubbing against the heads of the screws around which the rollers $c$ oscillate or on these latter (see Fig. 14).

Figure 15 shows detached from underneath escapement wheel $i^4$ of this form.

Figure 16 shows detached one of the rollers $c$ rendered movable by mounting its pivot on the lever $c^5$ pivoted at $c^6$ and subjected to the action of a spring $c^7$ fulcrumed at $c^8$ so that this movable roller constantly puts a light pressure on the ring $b^1$ so as to prevent the backlash in the gearing between this ring and its driving pinion and between this ring and the fixed rollers.

Furthermore this roller facilitates the removal of the ring $b^1$ by rendering superfluous the unscrewing of one of the fixed rollers $c$, which is necessary in the other constructional form for withdrawing the ring $b^1$ shut in between the grooves $c^2$.

Figs. 17 and 18 show two modifications of detail made on the constructional form of the anchor shown in Fig. 10 which does not bring about any change in the working thereof.

Finally Fig. 20 represents a different form given to the anchor so as to avoid the use of a snail of large radius. To obtain this result the beak $g^{24}$ on which the snail acts is arranged approximately in the middle of the lever $g^5$ which is in this case pivoted to one of its ends $g^{25}$. In this way the small movement caused at this centre will be sufficiently amplified at the other end to ensure the cogging of the teeth of the wolf's tooth wheel with which the pawl carried at this end engages. This pawl is provided at its rear end with a bent nose bent at a right angle on which the free end of a flat spring bears.

At its free end this anchor might also carry two pawls for driving at once the ring $b^1$ and the disc $b^2$ forming the movable dial.

The time indicator according to this invention instead of being an hour indicator as described with reference to the accompanying drawings in the preceding constructional forms might likewise be an indicator of days of the month, days, weeks, months, seasons, years, phases of the moon, etc., as the movable dial of this time indicator may bear any kind of indication whatsoever, and the device for operating this dial intermittently might be subjected to any kind of movement without altering the principle of this invention which is to actuate periodically a movable dial by means of a power borrowed from the clockwork movement of a time indicator so as not to interfere with the proper working of this movement.

Having now particularly described and ascertained the nature of my invention and in what manner the same is to be performed, I declare that what I claim is:

1. In a time indicator and in combination with a casing and a motor mechanism, a fixed dial having an opening therein, a revoluble dial having chronometric indications thereon visible through the opening in the fixed dial, a cannon pinion, an escapement wheel, an escapement anchor, means actuated from the cannon pinion for operating the escapement anchor in one direction, yielding means for actuating the escapement anchor in the opposite direction, and means for moving the said revoluble dial a predetermined portion of a revolution when the said escapement anchor releases the said escapement wheel.

2. In a time indicator and in combination with a casing and a motor mechanism, a fixed dial having an opening therein, a revoluble dial having chronometric indications thereon visible through the opening in the fixed dial, a cannon pinion, an escapement wheel, an escapement anchor adapted at its respective ends to engage the teeth on the escapement wheel, an eccentric, means for operating the eccentric from the cannon pinion to swing the escapement anchor in one direction to cause one end thereof to engage the teeth on the escapement wheel, resilient means for actuating the escapement anchor in the opposite direction to cause the other end thereof to engage the teeth of the escapement wheel, and means for turning the said revoluble dial a predetermined portion of a revolution when the said escapement anchor is released from the escapement wheel.

3. In a time indicator and in combination with a casing and a motor mechanism, a fixed dial having an opening therein, a revoluble dial having chronometric indications thereon visible through the opening in the fixed dial, a cannon pinion, an escapement wheel, an escapement anchor adapted at its respective ends to engage the teeth on the escapement wheel, an eccentric, a train of gears for operating the eccentric from the cannon pinion to swing the escapement anchor in one direction to cause one end thereof to engage the teeth on the escapement wheel, a spring for swinging the escapement anchor in the opposite direction to cause the other end thereof to engage the teeth of the escapement wheel, and means for turning the said revoluble dial a predetermined portion of a revolution when the said escapement anchor is released from the escapement wheel.

4. In a time indicator and in combination with a casing and a motor mechanism, a fixed dial having an opening therein, a revoluble dial having chronometric indications thereon visible through the opening in the fixed dial, a cannon pinion, an escapement wheel, an escapement anchor adapted at its respective ends to engage the teeth on the escapement wheel, an eccentric, a train of gears for operating the eccentric from the cannon pinion to swing the escapement anchor in one direction to cause one end thereof to engage the teeth on the escapement wheel, a spring for swinging the escapement anchor in the opposite direction to cause the other end thereof to engage the teeth of the escapement wheel, a disk turned with the said cannon pinion, a gear associated with the cannon pinion, a resilient device connecting the said disk and escapement wheel, a gear associated with the escapement wheel, and a pinion meshing with the last aforesaid gear and teeth on the revoluble dial whereby the revoluble dial is turned a predetermined portion of a revolution when the said escapement wheel is released by the escapement anchor.

5. In a time indicator and in combination with a casing and a motor mechanism, a fixed dial having openings therein, a revoluble dial having chronometric indications thereon visible through one of the openings in the fixed dial, a revoluble ring also having chronometric indications thereon visible through another opening in the fixed dial, a cannon pinion, an escapement wheel, an escapement anchor, means for actuating the escapement anchor in one direction from the said cannon pinion, a resilient device for actuating the escapement anchor in the opposite direction, and means operative when the escapement wheel is released by the escapement anchor for simultaneously turning the said revoluble dial and revoluble ring a predetermined portion of a revolution.

6. In a time indicator and in combination with a casing and a motor mechanism, a fixed dial having openings therein, a revoluble dial having chronometric indications thereon visible through one of the openings in the fixed dial, a revoluble ring also having chronometric indications thereon visible through another opening in the fixed dial, a cannon pinion, an escapement wheel, an escapement anchor, an eccentric device operated from the cannon pinion for swinging the escapement anchor in one direction to cause one end thereof to engage with the teeth of the escapement wheel, a resilient device for swinging the escapement anchor in the opposite direction to cause the other end thereof to engage with the teeth of the escapement wheel, and means operative when the escapement wheel is released by the escapement anchor for simultaneously moving the said revoluble disk and revoluble ring a predetermined portion of a revolution.

7. In a time indicator and in combination with a casing and a motor mechanism, a fixed dial having openings therein, a revoluble dial having chronometric indications thereon visible through one of the openings in the fixed dial, a revoluble ring also having chronometric indications thereon visible through another opening in the fixed dial, a cannon pinion, an escapement wheel, an escapement anchor, an eccentric, a train of gears operated from the cannon pinion for driving the said eccentric to swing the escapement anchor in one direction to cause one end thereof to engage the teeth of the escapement wheel, a spring for moving the escapement anchor in the opposite direction to cause the other end thereof to engage the teeth of the escapement wheel, and means operative when the escapement wheel is released by the escapement anchor for simultaneously moving the said revoluble disk and revoluble ring a predetermined portion of a revolution.

8. In a time indicator and in combination with a casing and a motor mechanism, a fixed dial having openings therein, a revoluble dial having chronometric indications thereon visible through one of the openings in the fixed dial, a revoluble ring also having chronometric indications thereon visible through another opening in the fixed dial, a cannon pinion, an escapement wheel, an escapement anchor, an eccentric, a train of gears operated from the cannon pinion for driving the said eccentric to swing the escapement anchor in one direction to cause one end thereof to engage the teeth of the escapement wheel, a spring for moving the escapement anchor in the opposite direction to cause the other end thereof to engage the teeth of the escapement wheel, a disk associated with the said escapement wheel, a spring connection between the said disk and the said escapement wheel, a gear also associated with the said escapement wheel, and a gear meshing with the last aforesaid gear and also with gears for operating the revoluble dial and revoluble ring whereby when the escapement wheel is released by the escapement anchor the said revoluble dial and revoluble ring is simultaneously turned a predetermined portion of a revolution.

In testimony whereof I have affixed my signature in presence of two witnesses.

ANDRÉ VARAUD.

Witnesses:
MAMIE NUY,
ROD. DE WURSTEMBERG.